(12) United States Patent
Triplet et al.

(10) Patent No.: US 11,444,824 B2
(45) Date of Patent: Sep. 13, 2022

(54) KNOWLEDGE BASE AND MINING FOR EFFECTIVE ROOT-CAUSE ANALYSIS

(71) Applicant: Ciena Corporation, Hanover, MD (US)

(72) Inventors: Thomas Triplet, Manotick (CA); Arslan Shahid, Stittsville (CA); Bruck Wubete, Nepean (CA)

(73) Assignee: Ciena Corporation, Hanover, MD (US)

( * ) Notice: Subject to any disclaimer, the term of this patent is extended or adjusted under 35 U.S.C. 154(b) by 142 days.

(21) Appl. No.: 17/109,331

(22) Filed: Dec. 2, 2020

(65) Prior Publication Data

US 2022/0173958 A1 Jun. 2, 2022

(51) Int. Cl.
  *H04L 41/0631* (2022.01)
  *H04L 41/16* (2022.01)
  *G06K 9/62* (2022.01)
  *G06N 20/00* (2019.01)
  *H04L 41/069* (2022.01)

(52) U.S. Cl.
  CPC .......... *H04L 41/065* (2013.01); *G06K 9/6262* (2013.01); *G06K 9/6276* (2013.01); *G06N 20/00* (2019.01); *H04L 41/069* (2013.01); *H04L 41/16* (2013.01)

(58) Field of Classification Search
  CPC ..... H04L 41/065; H04L 41/069; H04L 41/16; G06N 20/00; G06K 9/6262; G06K 9/6276
  See application file for complete search history.

(56) References Cited

U.S. PATENT DOCUMENTS

| | | |
|---|---|---|
| 10,171,161 B1 | 1/2019 | Côté et al. |
| 2018/0248771 A1 | 8/2018 | Côté et al. |
| 2018/0248905 A1 | 8/2018 | Côté et al. |
| 2019/0138948 A1 | 5/2019 | Janulewicz et al. |
| 2019/0228296 A1* | 7/2019 | Gefen ................... G06F 11/079 |
| 2019/0280942 A1 | 9/2019 | Côté et al. |
| 2019/0303726 A1 | 10/2019 | Côté et al. |
| 2020/0082013 A1 | 3/2020 | Triplet et al. |
| 2020/0084087 A1* | 3/2020 | Sharma ................. H04W 24/04 |
| 2020/0259700 A1 | 8/2020 | Bhalla et al. |
| 2020/0259717 A1 | 8/2020 | Ong et al. |
| 2020/0287788 A1 | 9/2020 | Triplet et al. |
| 2021/0117868 A1* | 4/2021 | Sriharsha .......... G06F 16/24568 |

* cited by examiner

*Primary Examiner* — Duc C Ho
(74) *Attorney, Agent, or Firm* — Clements Bernard Baratta; Lawrence A. Baratta, Jr.; Christopher L. Bernard

(57) ABSTRACT

Systems and methods for analyzing a root cause of issues in a network, such as an optical communication network, are provided. A method, according to one implementation, includes the steps of deriving symptoms indicative of issues in a network by utilizing performance data obtained from network elements in the network and storing the derived symptoms in a database. The method also includes the step of obtaining diagnostics from the network elements. Also, the method may include utilizing the database to compute distances between the derived symptoms and each of the diagnostics, whereby the computed distances may be configured to correspond to dissimilarities between the derived symptoms and the diagnostics. The distances are computed based on machine learning models, user feedback, and analytical functions. Also, the method includes analyzing a root cause of the derived symptoms based on a lowest distance selected from the computed distances.

20 Claims, 6 Drawing Sheets

| DIAGNOSTIC | CLASS | DISTANCE FUNCTION | REMEDIATION |
|---|---|---|---|
| $A_X$ | X | $\delta(\varphi_X(\sigma), A_X)$ | $\rho_A(\sigma)$ |
| $B_X$ | X | $\delta(\varphi_X(\sigma), B_X)$ | $\rho_B(\sigma)$ |
| $C_X$ | X | $\delta(\varphi_X(\sigma), C_X)$ | $\rho_C(\sigma)$ |
| $D_Y$ | Y | $\delta(\varphi_Y(\sigma), D_Y)$ | $\rho_D(\sigma)$ |
| $E_Y$ | Y | $\delta(\varphi_Y(\sigma), E_Y)$ | $\rho_E(\sigma)$ |
| $F_Z$ | Z | $\delta(\varphi_Z(\sigma), F_Z)$ | $\rho_F(\sigma)$ |

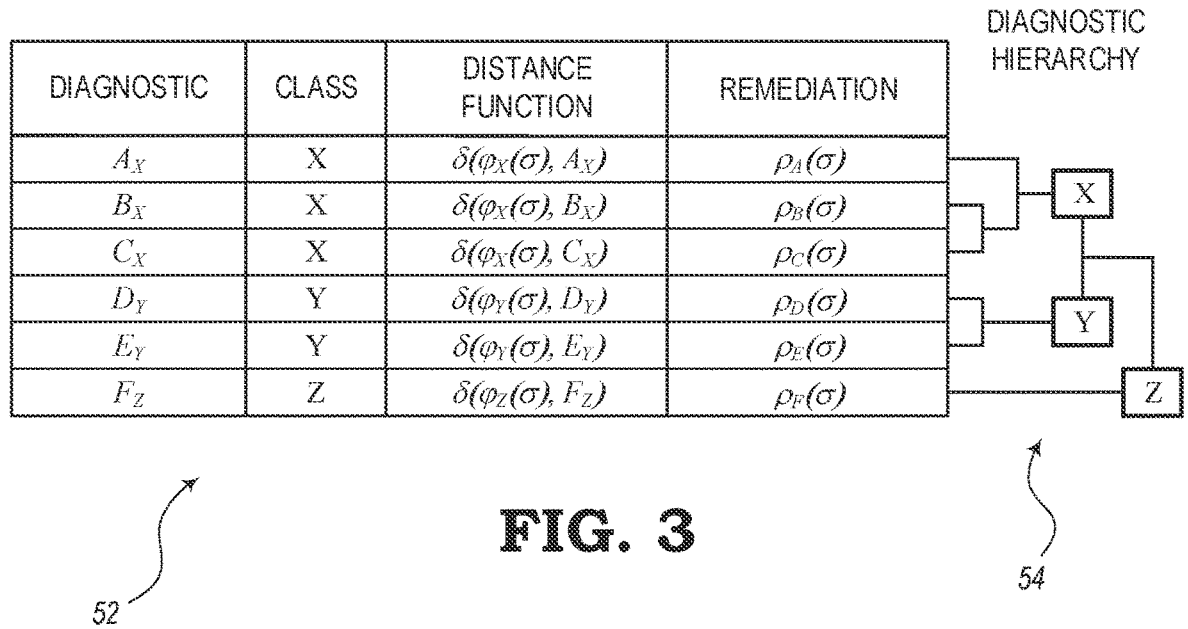

DIAGNOSTIC HIERARCHY

FIG. 3

| DIAGNOSTIC | CLASS | DISTANCE | WEIGHTING FACTOR | NORMALIZED DISTANCE |
|---|---|---|---|---|
| $A_X$ | X | $d(\sigma, A_X)$ | $w_A$ | $d(\sigma, A_X) * w_A$ |
| $B_X$ | X | $d(\sigma, B_X)$ | $w_B$ | $d(\sigma, B_X) * w_B$ |
| $C_X$ | X | $d(\sigma, C_X)$ | $w_C$ | $d(\sigma, C_X) * w_C$ |
| $D_Y$ | Y | $d(\sigma, D_Y)$ | $w_D$ | $d(\sigma, D_Y) * w_D$ |
| $E_Y$ | Y | $d(\sigma, E_Y)$ | $w_E$ | $d(\sigma, E_Y) * w_E$ |
| $F_Z$ | Z | $d(\sigma, F_Z)$ | $w_F$ | $d(\sigma, F_Z) * w_F$ |

FIG. 4

KNOWLEDGE BASE AND MINING FOR EFFECTIVE ROOT-CAUSE ANALYSIS

TECHNICAL FIELD

The present disclosure generally relates to networking systems and methods. More particularly, the present disclosure relates to systems and methods for analyzing symptoms of a network and performing root cause analysis.

BACKGROUND

As is known in the art, root-cause analysis involves identifying the root cause of faults or problems in a system (e.g., in a network). Typically, root-cause analysis is a manual process that involves users collecting relevant information (e.g., symptoms) about an issue at hand and comparing this information against known diagnostics. This is achieved by keeping an up-to-date error database that provides the user with the ability to conduct text searches to efficiently assess if the symptoms match a known error. However, this process can be error-prone since textual searches are usually not sufficient to conclusively determine that a set of symptoms matches a known error. Also, precious time may be lost in the process of investigating these issues. If this time were saved, it would reduce the time for which services were disrupted.

Several other approaches exist which try to automate this process by applying Machine Learning (ML) and/or rule-based techniques to create a ML model or other type of analytical technique, process, or algorithm. They accomplish this by analyzing the variations/trends in performance metrics and/or correlation of device events that result in a particular type of problem. Although, these approaches work in principal, they are not feasible for complex networks of heterogenous devices. This is because individual rules and/or models for each problem type must be customized and may not be able to be generalized to new types of problems.

The conventional solutions tend to have several disadvantages. For example, the technique of using textual searches to discover errors in a known error database is typically error-prone and time-consuming. If a new known error were to be added in a database of the conventional system, this addition would normally require hand-crafting specific rules and/or models, which again may be very time-consuming. Also, conventional systems do not have the ability to group diagnostics into categories based on the various types of issues that may be encountered in a network. In addition, known solutions do not normally allow the process of iteratively adding new diagnostics for root-cause analysis without significant rework (e.g., re-training a new multi-class ML model). Therefore, there is a need in the field of root-cause analysis to overcome the above-noted deficiencies in conventional systems to process symptoms in a network to diagnose root causes.

BRIEF SUMMARY

The present disclosure is directed to embodiments of systems, methods, and non-transitory computer-readable media for analyzing root causes of issues in a network, such as an optical communication network. According to one implementation, a system includes a network interface configured to obtain performance data from network elements of a network, a processing device, and a memory device. The memory device is configured to store a computer program having instructions that, when executed, cause the processing device to derive symptoms indicative of issues in a network by utilizing the performance data obtained from the network elements in the network and store the derived symptoms in a database. The instructions further enable the processing device to obtain diagnostics from the network and utilize the database to compute distances between the symptoms and each of the diagnostics. The distances correspond to dissimilarities between the symptoms and the diagnostics and are computed based on a plurality of machine learning models, user feedback, and analytical functions. The instructions also enable the processing device to analyze a root cause of the symptoms based on a lowest distance selected from the computed distances.

According to another implementation of the present disclosure, a non-transitory computer-readable medium is configured to store a computer program having instructions that, when executed, enable one or more processing devices to derive symptoms indicative of issues in a network by utilizing performance data obtained from network elements in the network and store the derived symptoms in a database. The instructions further enable the one or more processing devices to utilize the database to obtain diagnostics from the network and compute distances between the symptoms and each of the diagnostics, where the distances correspond to dissimilarities between the symptoms and the diagnostics, and where the distances are computed based on a plurality of machine learning models, user feedback, and analytical functions. The one or more processing devices are further configured to analyze a root cause of the symptoms based on a lowest distance selected from the computed distances.

According to yet another implementation of the present disclosure, a method is provided that include a steps of deriving symptoms indicative of issues in a network by utilizing performance data obtained from network elements in the network, storing the derived symptoms in a database, and obtaining diagnostics from the network elements in the network. The method also includes the step of utilizing the database to compute distances between the symptoms and each of the diagnostics, whereby the distances correspond to dissimilarities between the symptoms and the diagnostics, and whereby the distances are computed based on a plurality of machine learning models, user feedback, and analytical functions. Furthermore, the method includes the step of analyzing a root cause of the symptoms based on a lowest distance selected from the computed distances.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 3 is a graph illustrating distance functions and remediation functions of various diagnostics and diagnostic classes, according to various embodiments.

FIG. 4 is a graph illustrating normalized distances as a function of distance and weighting factor for various diagnostics and diagnostic classes, according to various embodiments.

DETAILED DESCRIPTION

Figure 1:
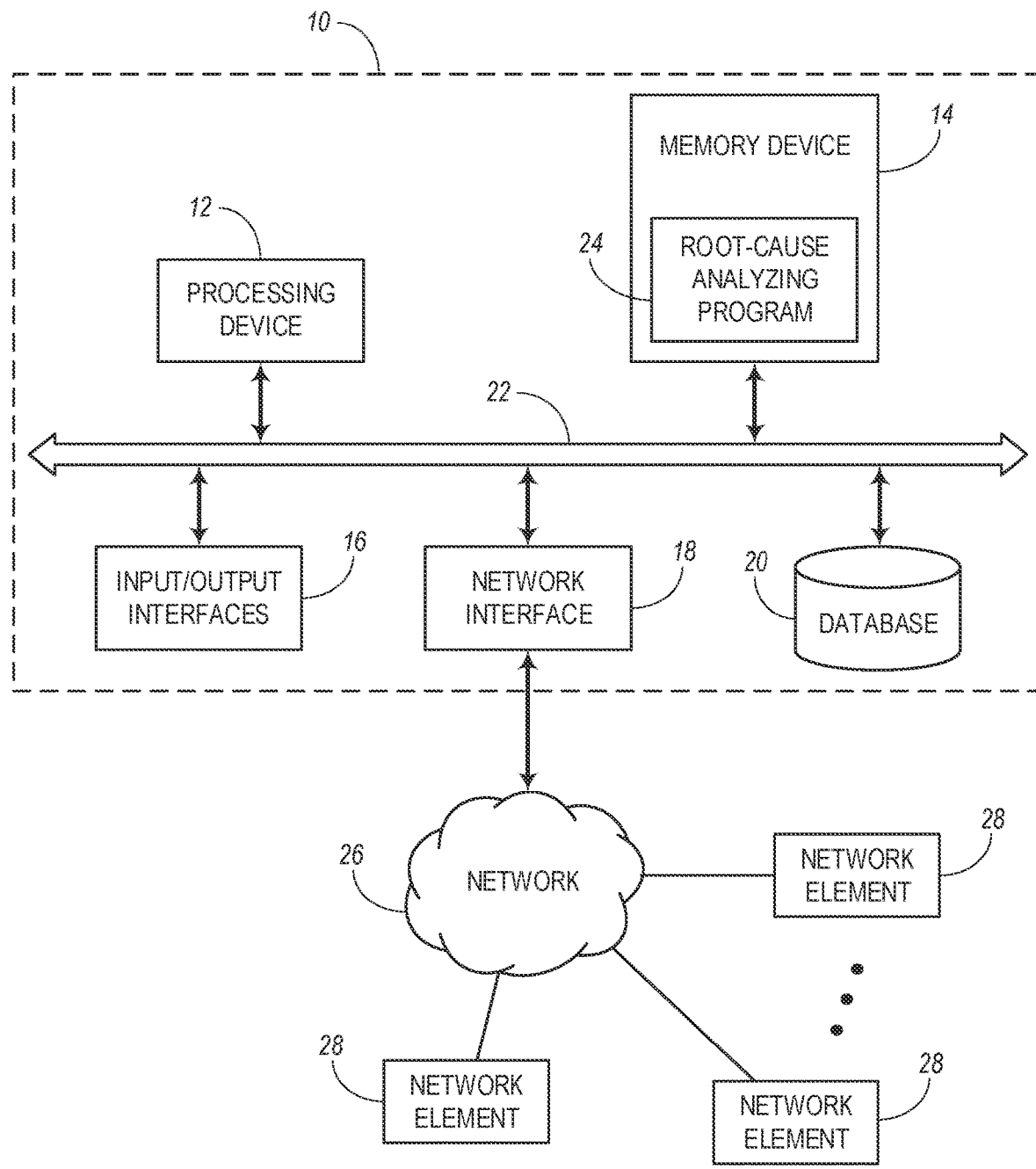
FIG. 1 is a block diagram illustrating a computing device for analyzing root cause, according to various embodiments of the present disclosure.

The present disclosure relates to systems and methods for root-cause analysis in a network (e.g., optical network, telecommunications network, etc.). The systems and methods described herein may include automating the process by applying Machine Learning (ML) techniques, analytical functions, rules-based processes, and/or user feedback. Therefore, the root-cause analysis described herein does not necessarily rely merely on ML techniques or ML models, but on analytics and user feedback. As described in the present disclosure, the systems and methods may include collecting data (e.g., Performance Monitoring (PM) data, network operational metrics, faults, errors, issues, alarms, symptoms, etc.) of Network Elements (NEs) 28 in the network. Analyzing root causes may also rely on a knowledge base or knowledge store, such as a Knowledge error Data Base (KeDB) that correlates measurable symptoms with diagnostics of various issues.

As described in detail below, the present disclosure also includes a distance detecting process for determining a "distance" (or dissimilarity) between symptoms and diagnostics. For example, the smaller the distance (in this regard) between a symptom and a diagnostic, the more likely the diagnostic is an accurate representation of the cause of that symptom. In some embodiments, the systems and methods may provide a closed-loop procedure that includes applying remediation actions to the network to correct the issues based on the one or more detected root causes.

The embodiments of the present disclosure are able to overcome many of the shortcomings of the conventional systems by combining the use of ML-based models for the distance computations along with a boosting technique for calibrating relative weights of distance functions for each diagnostic. The techniques described herein may employ various approaches to accomplish favorable results. For example, the present embodiments may allow a user to perform text searches with respect to known errors stored in a system database. The present embodiments may also apply specific rules in the system to identify a root cause and may apply supervised ML to predict diagnostics.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a computing device 10 for performing root-cause analysis within a network 26. In the illustrated embodiment, the computing device 10 may be a digital computer that, in terms of hardware architecture, generally includes a processing device 12, a memory device 14, Input/Output (I/O) interfaces 16, a network interface 18, and a database 20. The memory device 14 may include a data store, database (e.g., database 20), or the like. It should be appreciated by those of ordinary skill in the art that FIG. 1 depicts the computing device 10 in a simplified manner, where practical embodiments may include additional components and suitably configured processing logic to support known or conventional operating features that are not described in detail herein. The components (i.e., 12, 14, 16, 18, 20) are communicatively coupled via a local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a Central Processing Unit (CPU), an auxiliary processor among several processors associated with the computing device 10, a semiconductor-based microprocessor (in the form of a microchip or chip set), or generally any device for executing software instructions. When the computing device 10 is in operation, the processing device 12 may be configured to execute software stored within the memory device 14, to communicate data to and from the memory device 14, and to generally control operations of the computing device 10 pursuant to the software instructions.

It will be appreciated that some embodiments of the processing device 12 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 18 may be used to enable the computing device 10 to communicate over a network, such as the network 26, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the network 26, particularly to collect data from network elements 28 (e.g., nodes, switches, routers, Optical Add/Drop Multiplexers (OADMs), etc.) of the network 26.

The memory device 14 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store used to store data. In one example, the data store may be located internal to the computing device 10 and may include, for example, an internal hard drive (e.g., database 20) connected to the local interface 22 in the computing device 10. Additionally, in another embodiment, the data store may be located external to the computing device 10 and may include, for example, an external hard drive connected to the Input/Output (I/O) interfaces 16 (e.g., SCSI or USB connection). In a further embodiment, the data store may be connected to the computing device 10 through a network and may include, for example, a network attached file server.

The database 20 may be a Knowledge error Data Base (KeDB) for storing information that correlates various types of data retrieved from the network 26 with identifiable symptoms. Also, the database 20 may further be configured to store correlations between network symptoms and known diagnostics that can be used to classify or identify root causes. A user may enter feedback via the input/output interfaces 16 to add and/or revise data and/or relational information in the database 20.

Moreover, some embodiments may include a non-transitory computer-readable storage medium having computer readable code stored in the memory device 14 for programming the computing device 10 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

In particular, the memory device 14 may be configured to store a root-cause analyzing program 24, which may include Machine Learning (ML), such as supervised ML, unsupervised ML, etc. to train a ML model or other type of analytical process. In addition to ML functions, the root-cause analyzing program 24 may also use other forms of analytical functions as well as user feedback. According to various embodiments, the root-cause analyzing program 24 may be implemented in hardware, software, firmware, or any combination thereof. The root-cause analyzing program 24 may enable the processing device 12 to perform certain functions to analyze one or more root causes or issues in the network elements 28 operating on the network 26. The functions of the root-cause analyzing program 24 are described throughout the present disclosure.

For example, the root-cause analyzing program 24 may enable the processing device 12 to collect relevant data (e.g., PM data, alarms, etc.) from the network 26 via the network interface 18 and utilize the relational information of the database 20 to determine whether or not the relevant data points to any issues, errors, symptoms, etc. If so, the root-cause analyzing program 24 may be configured to compute distances between the detected symptoms in the network and known diagnostics. The distances may be used to classify (or rank) the diagnostics for sets of symptoms. Different types of distance functions may be used for different diagnostics. This process may involve ML boosting to calibrate the weights of the distances. The root-cause analyzing program 24 may use classifiers and/or diagnostics to analyze the root causes, such as by using filtering and ranking procedures. In some case, the root-cause analyzing program 24 may further provide automatic remediation processes for correcting or remediating the root causes in the network elements 28 of the network 26.

Figure 2:
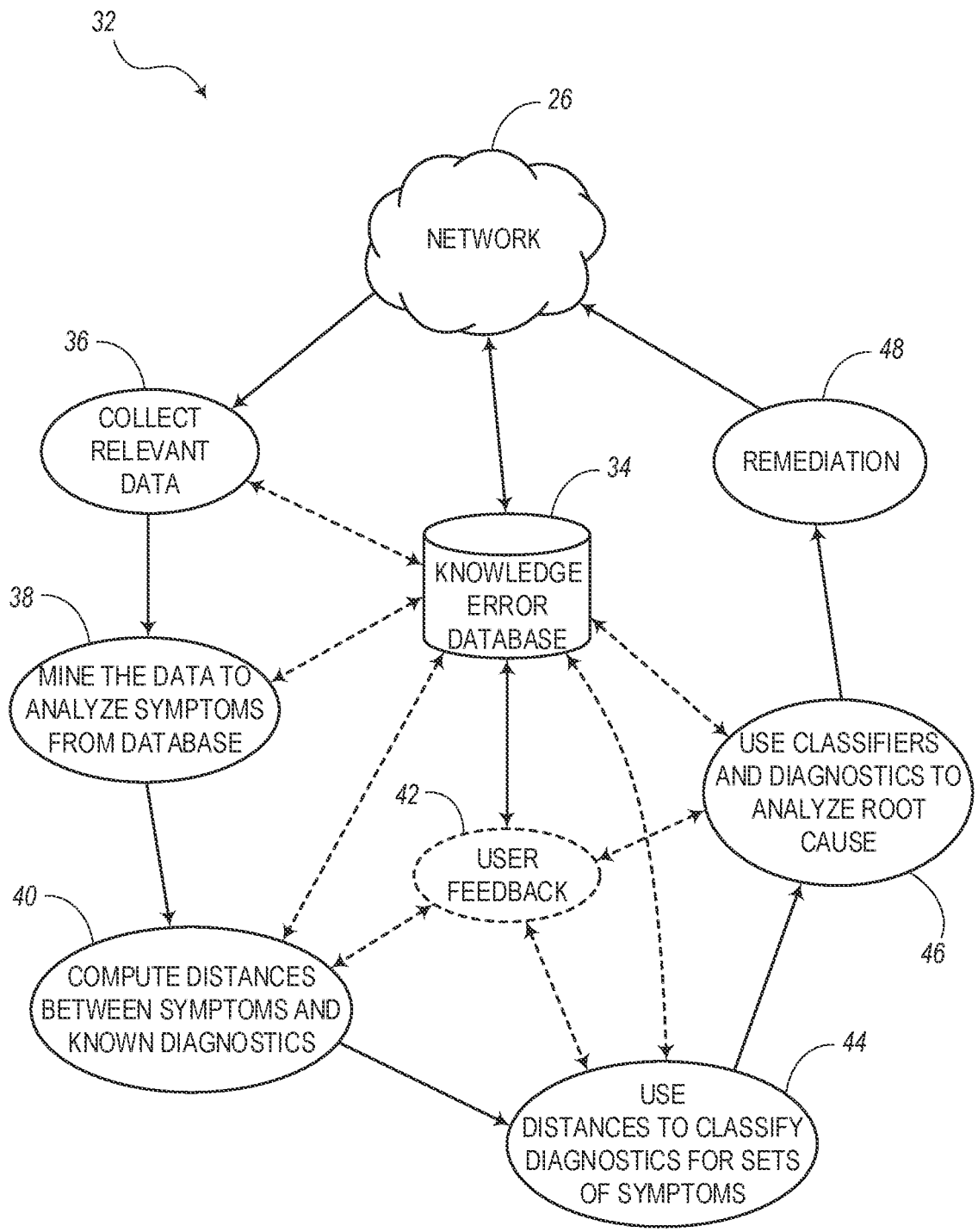
FIG. 2 is a diagram illustrating a system for analyzing root cause, according to various embodiments.

FIG. 2 is a diagram illustrating an embodiment of a system 32 for analyzing a root cause, where physical and functional features are shown. The network 26 shown in FIG. 1 (or other networks) may include network elements that are analyzed to determine any root causes that create issues in the network 26. The system 32 is configured to perform multiple actions for determining root causes and alternatively for performing remediation actions if possible. A first action 36 of the system 32 includes collecting relevant data from the network 26. This data may be stored in a Knowledge error Data Base (KeDB) 34 (e.g., the database 20 shown in FIG. 1 or similar data storage device). The system 32 further includes another action 38 of mining the data to analyze symptoms from the database 34.

The system 32 also includes the action 40 of computing distances between the analyzed symptoms and known diagnostics, the relationships of which may be stored in the KeDB 34. Also, the action 40 may include prompting a user (e.g., network operator, personnel at a Network Management System (NMS), etc.) to provide user feedback 42 for altering the relational data in the KeDB 34. For example, the data may be changed based on factors or knowledge that may not necessarily be gleaned from the network 26.

Also, the system 32 includes the action 44 of using the distances (computed in action 40) to classify diagnostics for sets of symptoms, which may be used to update the KeDB 34. Again, the user may provide user feedback 42 to further update the KeDB 34. The system 32 also includes the action 46 of using classifiers and diagnostic information to analyze one or more root causes in the network 26 and again the KeDB 34 may be updated as a result of this action 46 or via user feedback 42. Knowing the root cause may end the process at this point. However, in some embodiments, the system 32 may further include an action 48 of performing remediation to correct or remediate the network 26 based on the one or more root causes. If remediation is not possible, the root causes can be communicated to the user to allow the user to initiate maintenance procedures, deployment new or replacement equipment, instruct experts to perform upkeep or modification processes on the nodes or networks elements of the network 26, and/or other suitable processes to reduce the issues, root causes, etc. on the network 26.

Therefore, the present disclosure describes embodiments of Machine Learning (ML) processes and ML-based systems for effective root-cause analysis. A common approach for root-cause analysis is to leverage supervised ML, and train an algorithm (e.g., ML model) to recognize a particular diagnostic, given some input data from the network 26 (e.g., performance metrics, alarms, topology, etc.). In this common scenario, a binary classifier can be trained to determine if a diagnostic (D) is the root cause of the issue or not. Multi-class classifiers (e.g., random forests, deep neural networks, etc.) may be used as well to identify a particular root cause. For example, each ML class may correspond to a root cause. This approach works well to identify a particular class of problems, wherein the root causes are reasonably similar, such as when the input data from the network elements 28 are similar and may be used to feed a classifier.

Conventional approaches fall short for multi-domain networks, such as those found in most medium/large enterprises. Those enterprise networks typically comprise elements such as Layer 2 (L2) switches, Layer 3 (L3) routers, firewalls, Wi-Fi controllers and access points, Software-Defined Wide Area Network (SD-WAN) controllers and edge devices, Virtual Network Functions (VNFs), and applications in the cloud. Consider an example of a typical scenario in an Information Technology (IT) system where an employee is unable to access a document on a cloud or server in a lab from the employee's laptop. Some of the possible root causes may include issues with Wi-Fi connectivity, security of a Virtual Private Network (VPN), hardware failure of a switch/router in the lab, incorrectly configured firewall, etc.

Unlike other conventional disclosures on root-cause analysis which focus on model training and accuracy, the present disclosure may include knowledge representation to build an ML-based known-error database (e.g., database 20, KeDB 34, or other suitable data storage devices). The present disclosure may also include data mining aspects (e.g., action 38) to enable the systems to effectively identify a root cause (e.g., action 46) amongst many in heterogeneous multi-domain networks when new unknown symptoms are fed to the system 32. Furthermore, the present disclosure provides additional embodiments of frameworks for data driven root-cause analysis by enabling the following procedures, which may be conducted by the processing device 12 using the root cause analyzing program 24 shown in FIG. 1.

In the present disclosure, it may be assumed that a data collection system is available to collect relevant data from the network elements 28, including performance metrics, alarms, system logging protocol (syslog) messages, Simple Network Management Protocol (SNMP) traps, topology, etc., and stream the data to a message bus. In a typical software deployment, data may be collected (e.g., action 36) by the data collection framework of a suitable program and messages may be pushed to a stream-processing software platform (e.g., root cause analyzing program 24) and a relational database (e.g., database 20, KeDB 34, etc.).

One embodiment of the present disclosure includes a mechanism (e.g., network interface 18) to facilitate the mining of relevant diagnostics given a set of symptoms, for automating the process of root-cause analysis in a way that can generalize well to accommodate to new types of problems. A first step of the mechanism may include (1) collecting relevant data (e.g., action 36) from the network 26 and stream them to a message bus (e.g., local interface 22) that is connected to a database. A second step may include (2) computing the distances (e.g., action 40) of new data (symptoms) to known diagnostics (and diagnostic families) from knowledge stored in the KeDB 34. This computation (i.e., action 40) may use both analytical and Machine Learning (ML) based models. A third step may include (3) calibrating the weight of the distance functions (e.g., action 44) for each diagnostic using ML boosting algorithms. A fourth step of the mechanism may include (4) filtering and ranking the diagnostics (and diagnostic families) (e.g., action 46) to present only relevant diagnostics to the end user. If the diagnostic is specific enough, an optional fifth step (e.g., action 48) may include (5) automatically applying remediation actions to address the issue.

Distance Computation Actions

Instead of using the output of a supervised model to predict a root cause given a set of symptoms, the system 32 may use ML, analytical formulas, or user feedback (or any combination thereof) to compute a "distance" between a set of symptoms (e.g., one or more observed network problems) and the known diagnostics. The term "distance" as used in this case is a measure of the dissimilarity of the observed network problem from a known diagnostic. The smaller the distance, the more likely that a particular root cause/diagnostic has been found.

The choice of one algorithm versus another depends on the actual data. It may be worth noting that the approach allows the system 32 to explicitly leverage feedback from users (e.g., user feedback 42) to compute the distance, unlike typical ML systems where user feedback is only used to enrich the input dataset and implicitly improves the ML model when it is retrained.

Hierarchical Root-Cause Analysis

Root causes have a natural hierarchical structure dictated by the resolution process followed by users (e.g., network operators). The user or operator may start with the most likely and general root causes, then proceed to eliminate potential issues and refine the diagnostic to pin-point the exact issue. For instance, assuming a user cannot access a resource, the system 32 may ask if the user is connected via a direct connection or Wi-Fi. If connection is via Wi-Fi, the components associated with the Wi-Fi may be a coarse root cause, but the operator may refine the root cause by enquiring about various operating aspects (e.g., the version of the Wi-Fi driver installed in the laptop, authentication issues, etc.).

One of the benefits of this approach is that the system 32 can handle the natural hierarchical nature of root causes. Specifically, the distance functions (e.g., actions 40, 44) may be generalized to internal nodes in the root cause tree (e.g., families or types of root causes) in addition to leaves (e.g., actual or specific root causes). This is particularly useful when the distance between unknown symptoms and root causes is too high, meaning that an actual root cause cannot be predicted with high confidence. However, it may still be possible to predict the class of root cause. For instance, considering the previous example, while it may not be possible to accurately predict if the root cause is a Wi-Fi driver issue or a misconfiguration of an Lightweight Directory Access Protocol (LDAP) server, the system may still be able to compute a small enough distance between the symptoms and an root cause type (Wi-Fi vs. LAN). In this case, the root cause analysis is not specific enough to enable effective close-loop automation. However, it is still valuable to the network operators as it will help them reduce the time to resolve the problem.

FIG. 3 is a table 52 showing examples of diagnostics, diagnostic classes, distance functions, and remediation functions for an embodiment of a network having a diagnostic hierarchy 54 as shown. The distance functions are a factor of the corresponding diagnostic and aspect of the diagnostic class. The remediation functions are a factor of the corresponding diagnostic.

The table 52 includes three different classes X, Y, and Z. For each class, there may be pre-processing functions and then a distance function that may be a combination of the pre-processing function and a model for computing this. According to one example, assume that $A_X$ and $B_X$ are close enough (i.e., small "distance" value) such that they can be grouped under the X node, which is not a leaf but an internal node. The next time that some symptoms are collected and there is not enough information in the relevant database regarding these symptoms to confidently predict that either diagnostic $A_X$ or $B_X$ may be preferred, the system can check against X to confidently determine that the issue is of class X. This may be useful in later iterations since the system is a heterogeneous network and issues may come back again.

If there is a Wi-Fi domain and a LAN domain, the type of issue happening in the network can affect one or more users. Using the comparison against intermediate nodes, the systems can give valuable information about the types of issues that are detected. The system can determine whether the issue belong on the Wi-Fi domain or the LAN domain. Also, the system 90 may be configured to determine if the issues affect a single user or multiple users. This may be helpful information for viewing the issues in a network and getting a sense of the priority for correction of the issues.

Calibration Actions

Once the distance computation (e.g., actions 40, 44) is finished, the next step is to use these distance values to form a ranking (e.g., action 46) of diagnostics for a given set of symptoms (e.g., observed network issues). In a very simple case where a single closed-form expression serves a distance function for two or more diagnostics, the system 32 can simply sort the diagnostics in ascending order using distance values to accomplish this.

FIG. 4 is another table 60 showing diagnostics, diagnostic classes, distance functions, weighting factors, and normalized distance calculations. The system 32 may use the table 60 for weighting and ranking the diagnostics.

Since the data may be collected (e.g., action 36) from disparate sources, the system 32 allows different types of distance functions (e.g., $d(\sigma, A_X)$, $d(\sigma, B_X)$, $d(\sigma, D_Y)$, etc.) for different diagnostics. Furthermore, the way in which the system 32 evaluates these distance functions might be very different (e.g., ML models, analytical formulas, user feedback, or a combination of these). This approach enables the system 32 to compute distance from the diagnostics independently, which allows the system 32 to scale out horizontally. It also enables the KeDB 34 (or other knowledge base or data store) to be iteratively augmented by only defining and storing a new distance function for new diagnostics or new classes, without requiring an update to existing functions.

However, a challenge with the present approach is that the distance functions are typically independent. Hence, the scale used by each distance function for a particular diagnostic may not be the same as others. For example, the range of distance values for distance function for a diagnostic $A_X$ might be between 0 and 1, whereas the range for diagnostic $B_X$ might be between 0 and 100. In this case, the system 32 may utilize a normalization process for normalizing the distance values. To normalize the range discrepancies, the system 32 may employ a ML boosting approach to calibrate the "weights" of these distance functions, which may include one or both of actions 44 and 46. The ML model may be trained with examples from past network states to learn the weights of a distance function for each diagnostic. This allows for a direct comparison of diagnostics. For example, when diagnostic $A_X$ and diagnostic $B_X$ have weights $W_{A\_X}$ and $W_{B\_X}$ that can be used for normalization, the normalized values can then be compared so that diagnostic $A_X$ can be favored over diagnostic $B_X$ when the following condition is met: $W_{A\_X}*d(\sigma, A_X) < W_{B\_X}*d(\sigma, B_X)$.

The weight calibration (e.g., actions 44, 46) happens at the time when distance functions (FIG. 3) are developed, and these weights are readily available for use when the system 32 performs root-cause analysis. In order to compute the ranking, which may also include one or both of actions 44 and 46, the system 32 may introduce the concept of normalized/weighted distance which is a product of the distance function (FIG. 3) and the weighting factor (FIG. 4). The weighting factor is a characteristic of the distance function for a particular diagnostic. If a distance function for a particular diagnostic is changed, the corresponding weighting factor may need to be computed again.

Ranking Actions

The ranking (e.g., action 44) of diagnostics can then be determined by computing normalized distances and then sorting them in decreasing order. It is important to note that even when a ranking is available, the system 32 might not be able to deduce a root cause with high confidence if all the distance values are relatively equal and small in magnitude. This can happen if the system 32 encounters a new type of problem that it does not know about or if the symptom data does not have enough information to pin-point the issues. In order for the system 32 to be confident about a diagnostic, the normalized distance should be sufficiently close to zero. As part of the weight calibration process, the system 32 may also learn a threshold $\lambda$ such that $d(\sigma, A_X)*w_A<\lambda$ results in making $A_X$ a valid diagnostic for symptoms observed.

Optional Close-Loop Automation Actions

If the distance of the top ranked (i.e., rank number 1) diagnostic is sufficiently low and the distance of other potential diagnostics (i.e., rank numbers 2 or lower) is high enough, then the top ranked diagnostic is the most likely with a high confidence value, in which case it may be possible to automatically execute the remediation action (e.g., action 48) associated with this diagnostic. Remediation may include automatically using a Network Management System (NMS) or a service orchestrator. Alternatively, remediation may be a semi-automatic process that involves human intervention.

Notations

A function $\delta: X \times Y \rightarrow (0, \infty)$ is a distance if it satisfies (1) the identity axiom, (2) symmetry and (3) the triable inequality, i.e.:

$$\delta(x,y)=0 \Leftrightarrow x=y \qquad 1)$$

$$\delta(x,y)=\delta(y,x) \qquad 2)$$

$$\delta(x,z) \leq \delta(x,y)+\delta(y,z) \qquad 3)$$

where
  $\sigma$, a symptom of a problem
  $\nabla=\{X,Y,Z\}$, the diagnostic classes
  $A_X$, a diagnostic of class X
  root cause (RC)=$\{A_X, B_X, C_X, D_Y, E_Y, F_Z\}$, all the diagnostics in the knowledge base
  $\varphi_X$, a preprocessing function to transform data in a format suitable for diagnostics of class X
  $\Phi\_RC=\{\varphi_X, \varphi_Y, \varphi_Z\}$, the preprocessing functions given RC
  weights=$\{w_A, w_B, w_C, w_D, w_E, w_F\}$, the weights used to normalize distance for each diagnostic
  $\lambda$, a threshold for checking validity of a diagnostic The distance may be defined as follows: $d(\sigma, A_X)=\delta(\varphi_X(\sigma), A_X)$, where the distance represents the dissimilarity between a symptom and a diagnostic $A_X$. The distance $d(\sigma, A_X)$ may be further defined by: $\{<\infty$ if class$(\sigma)$=X and $=\infty$ if class$(\sigma) \neq X\}$ In other words, the distance between a symptom and a diagnostic may be well-defined, whereby the class of a symptom corresponds to the class of a diagnostic. The distance may be large if the classes are different. The choice of the distance function may be important in various embodiments of the present disclosure and enables the system 32 to rank the different potential diagnostics given a network problem.

Root Cause Analysis System

Figure 5:
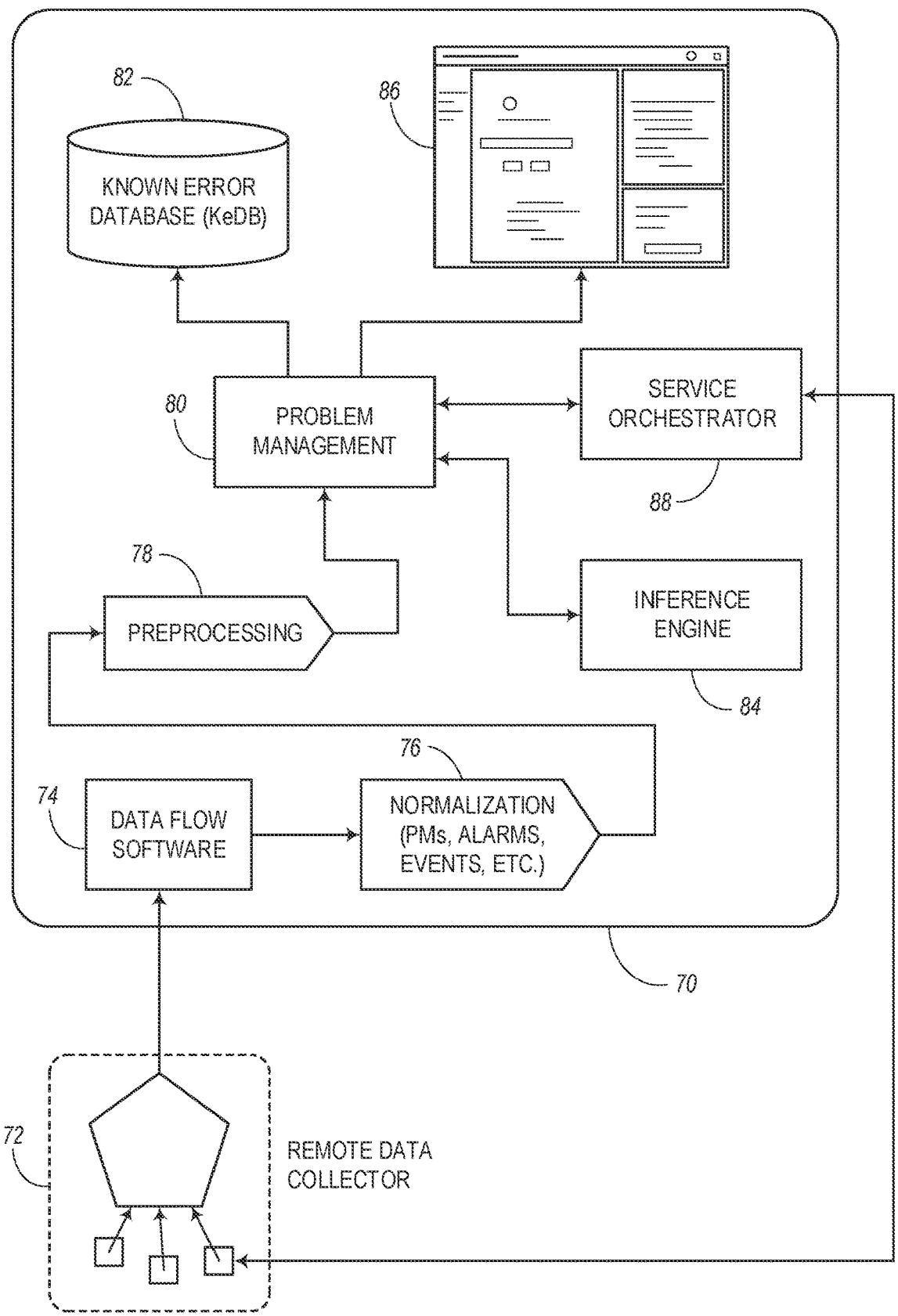
FIG. 5 is a diagram illustrating another system for analyzing root cause, according to various embodiments of the present disclosure.

FIG. 5 illustrates another system 70 for analyzing the root causes of a network. The system 70 may include many similarities to the system 32 of FIG. 2. The system 70 may be configured to communicate with (or may include) a remote data collector 72 configured to collect data from a plurality of network elements (NEs) of a network. Data collection may include obtaining information of the operational status and various parameters measured from the NEs. Also, data collection may include receiving the data remotely from telemetry devices. The remote data collector 72 is configured for effective, resilient, and low-latency data collection to thereby allow the system 70 to perform near real-time root-cause analysis.

The remote data collector 72 may be an agent that is present on the premises of a node or network element being analyzed. In some cases (e.g., with SD-WAN or when using cloud-based VNFs), the agent may be deployed in the cloud. In those cases, the rest of the flow may remain the same, except for the location of the agent. The system 70 is configured to be connected to and receive collected data from different type of devices to obtain performance metrics, Performance Monitoring (PM) data, errors, faults, issues, alarms, syslogs, system events, network topology, etc., from a number of network elements. The remote data collector 72 may include an out-of-the-box data collection device that may be configured to perform normalization and pre-processing. Messages indicative of the collected data may be passed in a push or pull manner from the remote data collector 72 to data flow software 74 of the system 70.

The data flow software 74 may be configured to pass the obtained data to a normalization device 76. The normalization device 76 may be configured to use open source components to parse out the messages coming from various remote data collectors 72 and transforms them into a standard format so that it can be consumed by other components in the system 70 in a device-agnostic way. The normalization device 76 may include the normalization of Performance Monitoring (PM) data, operational or functional metrics, alarms, events, faults, errors, issues, or other types of information or symptoms.

The normalized data is passed to a pre-processing component 78, which is configured to perform feature extraction of the data. The pre-processing component 78 may be configured to convert all messages (e.g., performance metrics, PM data, alarms, syslogs, system events, etc.) into a fixed length feature vector. These messages or vectors are then passed along a problem manager 80, which may be processing device (e.g., processing device 12) or other type of controller for controlling various components and devices of the system 70.

The problem manager 80 may be in communication with a Known error Data Base (KeDB) 82, which may be the same as or similar to the database 20 and/or KeDB 34. The KeDB 82 may represent a persistence layer that stores the information about the known diagnostics. For example, the stored information may include diagnostic classes, pre-processing functions, distance functions, calibrated weights, relevant features, etc. The KeDB 82 may serve in a ML-based system that facilitates root-cause analysis.

The problem manager 80 may also be in communication with an inference engine 84. The inference engine 84 may provide a service that allows the system 70 to pass a given set of symptoms in the form of a fixed length feature vector and output a model prediction. In some embodiments, the model prediction may include a distance calculation for determining a distance from a given set of symptoms (i.e., observed network problems) to one or more known diagnostics. The inference engine 84 relies on a catalog of models to accomplish this. For instance, the inference engine 84 may include loading a given model into an open source inference framework (e.g., mxnet) and feeds it with the input data to produce an inference output. According to some embodiments, the inference outputs may be distance values between symptoms (e.g., network issues) and known diagnostics. The distance values may include a function, such as $d(\sigma, A_X)$.

The problem manager 80 may be configured to interact with the KeDB 82 and inference engine 84 to trigger the computation of distance functions for all diagnostics. The problem manager 80 may then normalize these distances using weights to come up with a ranking of diagnostics for a given network problem. It may also communicate with a User Interface (UI) component 86 (e.g., via Representational State Transfer (REST) APIs, web sockets, or other suitable means) to facilitate visualization of this information. For example, the REST architecture may be configured for operation to provide performance, scalability, simplicity, modifiability, visibility, portability, and reliability. The UI component 86 may be configured on a presentation layer and give user access to the information via any suitable display device, such as a Graphical User Interface (GUI).

The system 70 further includes a service orchestrator 88 in communication with the problem manager 80. Once a root cause has been identified, the problem manager 80 can apply the corresponding remediation actions to the devices (or network elements) of the network with the help of the service orchestrator 88. The service orchestrator 88 may include the capability to interact with the devices and push any changes needed to fix the root cause.

Therefore, the systems 32, 70 for analyzing root cause in a network may have a number of advantages over the conventional devices. For example, the systems described in the present disclosure are configured to leverage distance functions using a combination of Machine Learning (ML) models, user feedback, and analytical functions (or combinations thereof) to encode and represent high-level information about previously recorded errors and diagnostics. Also, the systems and methods of the present disclosure are configured for grouping known diagnostics in a KeDB or knowledge base, which may be configured into a hierarchical structure to allow diagnostic specificity. In some embodiments, the diagnostics may use distancing functions and utilize thresholds for determining if a distance is greater than (less likely to be a match) or less than (more likely to be a match) certain threshold values.

Additionally, the present embodiments may include a hierarchical representation of errors to thereby enable a computationally effective mining of potential diagnostics. For example, this process may include using b-trees (e.g., log complexity), which include self-balancing data structures that maintain sorted data and allow searches, sequential access, insertions, and deletions in logarithmic time. The b-tree generalizes the binary search tree and may be suited for storage systems that read and write relatively large blocks of data.

Also, the systems and method described herein may include decoupled distance functions for each particular diagnostic and/or each class of diagnostic using the above-described hierarchy. Furthermore, the present embodiments may include an action of calibrating weights of distance functions for each diagnostic by using ML boosting techniques.

According to various operations of the various systems described in the present disclosure, the present methods may have several advantages over conventional approaches. For example, the present systems and methods may provide results in a ranking of different diagnostics for a given issue. The systems 32, 70 may compute the distance of the issues at hand with all the known diagnostics, which allows the systems to construct a ranking for the probable diagnostics.

This representation allows users to view and provide feedback about multiple diagnostics for the same problem. Also, this might be helpful when multiple root causes exist and are contributing to the same problem.

Figure 6:
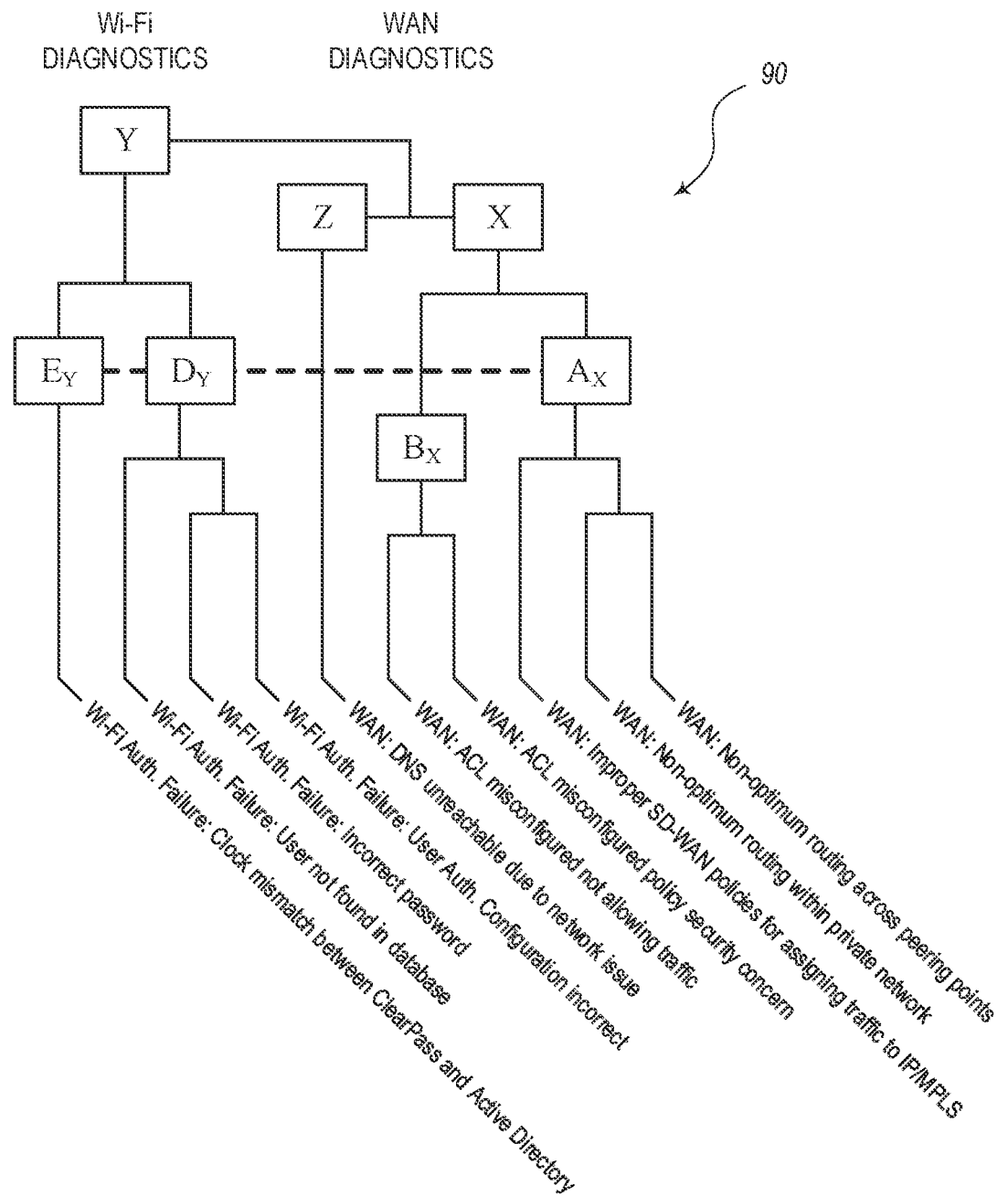
FIG. 6 is a diagram illustrating an example of a diagnostic tree for analyzing root cause, according to various embodiments.

FIG. 6 is a diagram illustrating a system 90 of a cluster dendrogram having Wi-Fi diagnostics and Wide Area Network (WAN) diagnostics. The system 90 shows another aspect of the operational principles of the present disclosure in that the system 90 (or other systems 32, 70) enables a hierarchical structure for diagnostics to allow arbitrary diagnostic specificity. A distance-based approach allows grouping of known diagnostics into a hierarchical structure which facilitates in identifying diagnostics with arbitrary specificity. Several diagnostics are clustered into a hierarchical structure by using distances between them. In this example, two classes of distance functions are used, i.e., $\nabla = \{\text{Wi-Fi distance class and WAN distance class}\}$. For instance, if a detected network issue has the least weighted distance from the diagnostics (indicating a close fit), a Domain Name System (DNS) may be unreachable due to an issue in the network (e.g., WAN). It can immediately determine that the issue is associated with the WAN domain.

This information can be helpful in directing the issue to the relevant individual or team. Also, in the absence of enough data to identify a specific diagnostic, this approach allows the system to identify the class/type of issues with good confidence by computing distance from a class/type of issues. Furthermore, as shown in FIG. 6, a horizontal line can be drawn at any specificity level to help deduce the category of issue at that level. In one example, the horizontal line may result in grouping together three Wi-Fi authentication diagnostics from the $D_Y$ component. These Wi-Fi diagnostics have the common behavior that they only affect individual users. If applying root-cause analysis techniques for a new problem results in a high distance for all specific diagnostics (leaves), the system 90 can still deduce the type of issue by computing a distance using class level distance function. In this particular example, the system 90 can know that only individual users are impacted for this Wi-Fi issue.

The system 90 allows for b-tree type searches, which may provide a more efficient way (e.g., logarithmic vs linear) to find issues and perform root-cause analysis. The system 90 may be able to construct hierarchical structure, which may allow a user to search for diagnostics in a more efficient way. For instance, the searching may involve a logarithmic order compared to a linear order, which may be the case in the absence of a hierarchical structure. This configuration may lend itself better for iterative development.

Also, the approach defined by the system 90 allows a user to add new diagnostics and the corresponding distance functions iteratively without affecting the existing diagnostics. The only additional work in this case would be to recalibrate the weights. This procedure can greatly simplify the development process and allow a customer to deploy a related system or product in the field quicker. The diagnostic library may have a limited set of diagnostics initially, which may be configured to grow over time. The distance computation complexity in this case may be linear with respect to the number of root causes in the KeDB (or other knowledge base or data store) and can be trivially distributed in a cluster if horizontal scalability is desired.

As a result, the systems 32, 70, 90 may include an important component of an enterprise software product. The new product may use Artificial Intelligence (AI) and Machine Learning (ML) methods to perform closed loop automation. In some embodiments, the systems and methods may be implemented in a practical framework for closed loop automation in heterogeneous enterprise networks.

The embodiments of the present disclosure provide a way to build a KeDB or knowledge store for root cause analysis. The relational databases (e.g., databases 20, 34, 82) may store information regarding known issues along with different models that can be used to evaluate the similarities of the respective system. The system 90 shows a root cause analysis system, where a classifier may be configured to predict one issue. The system 90 includes a connector structure between the various diagnostics. In this embodiment, the system 90 includes ten definitions of different diagnostics in this example, which may pertain to authorization failures, clock mismatches, incorrect passwords, incorrect configurations, network issues, ACL misconfigurations, policy security issues, improper policies, non-optimum routing, etc. These and other issues may be defined as various diagnostics in the present disclosure.

The embodiments of the present disclosure may be targeted at heterogeneous networks where the devices span different technologies or where the nature of data might be different. The systems described herein solve the issue of how to build a framework for such heterogeneous networks. Symptoms are collected and compared against known diagnostics in a way that the systems can iteratively add new known diagnostics into the respective databases. Information can be obtained from these databases each time new symptoms are collected from the network. The systems are able to provide a ranking to the user based on the most likely known root causes and may further calculate how much confidence the systems have that the root causes are correct.

Initially, the systems may have an option to close a loop. In other words, if the system is confident about the known symptoms and a likely root cause prediction, the system may then go ahead and perform remediation actions that will fix the root cause automatically (when possible).

The embodiments of the present disclosure may use automated process to approach the concept of analyzing a root cause. The systems may obtain a classifier that takes an input and is able to provide a diagnostic as an output. The present systems may further incorporate user feedback, which may include returning to the beginning and modifying input data to retrain the classifier. The systems herein allow user feedback to be incorporated without the need to train new models. Another advantage is that it can put the user diagnostics into classes, since it uses a distance function, instead of directly coming up with an outcome for a known diagnostic. One advantage of the distance function is that the systems can use a threshold to which the distances can be compared and thus the diagnostics can be grouped together. If there is a small distance, the corresponding symptoms and diagnostics can be grouped together. When there is not enough data to predict specific problems, the systems can predict different classes of problems.

Another advantage with the present embodiments is that the systems may utilize an iterative development. The systems are set up such that distance functions can be used. Since data is handled from different devices (i.e., in a heterogeneous network), the use of weights may be used. The systems also iterated development in order that the systems can keep adding new diagnostics, new pre-processing, distance functions, new weights, etc. without the need to change them for an altered network. These factors can be stored in the database.

It is possible to incorporate user feedback without having to retrain a ML model. It is also possible to group various diagnostics into classes. In some embodiments, the grouping into classes may be processed first. Then, when needed, user feedback may be obtained which can be derived from the results of the diagnostics groupings. The systems also have the ability at this point to add the new diagnostics and their functions iteratively.

Figure 7:
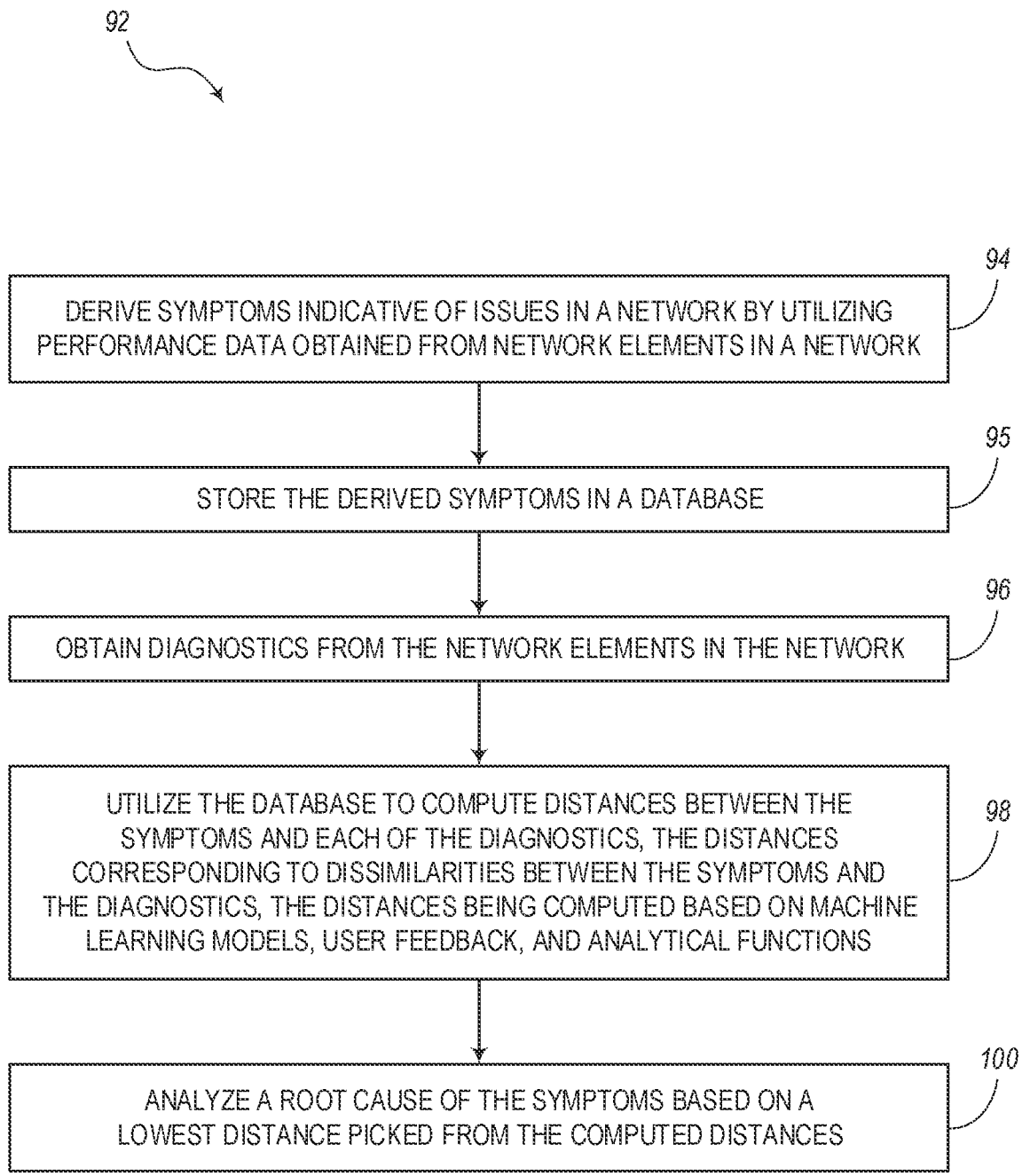
FIG. 7 is a process for analyzing root cause of issues in a network, according to various embodiments of the present disclosure.

FIG. 7 is a flow diagram illustrating an embodiment of a process 92 for performing root-cause analysis to find a root cause of issues within a network. According to some embodiments, the process 92 may include actions performed by one or more of the systems 10, 32, 70, 90. The functionality represented by the process 92 may include software or computer logic stored in a computer program, API, etc., such as the root-cause analyzing program 24 shown in FIG. 1. For example, the process 92 may be stored in a non-transitory computer-readable medium (e.g., memory device 14) and may be configured to enable one or more processing devices (e.g., processing device 12) to execute certain functions or actions. The network interface 18 may also be used to collect data from network elements operating in a network (e.g., network 26)

In this embodiment, the process 92 may include the step (block 94) of deriving symptoms indicative of issues in a network by utilizing performance data obtained from network elements in a network. The process 92 also include storing the derived symptoms in a database, as indicated in block 95. Also, the process 92 includes obtaining diagnostics from the network elements in the network, as indicated in block 96. As indicated in block 98, the process 92 may further include the step of utilizing the database to compute distances between the symptoms and each of the diagnostics. The distances may correspond to dissimilarities between the symptoms and the diagnostics and may be computed based on machine learning models, user feedback, and analytical functions. Also, the process 92 may include the step of analyzing a root cause of the symptoms based on a lowest distance selected from the computed distances.

According to some embodiments, the process 92 may further include the step of classifying the diagnostics by grouping the diagnostics into multiple groups based on a distance function related to the computed distances. The process 92 may also include utilizing a weighting factor to determine normalized distances of the diagnostics, where the normalized distances are configured to account for different ranges of diagnostics from different network elements of the network. In addition, the process 92 may include the step of collecting relevant information from the network elements and streaming the relevant information as the symptoms, whereby the relevant data includes one or more of Performance Monitoring (PM) data, performance metrics, errors, faults, issues, alarms, network topology, etc. Furthermore, the process 92 may include conducting supervised ML to train a ML model or other suitable type of algorithm or analytical procedure for recognizing the diagnostics.

In additional embodiments, the process 92 may include the step of receiving user feedback configured to revise one or more diagnostics stored in the database. For example, the database may be a Known error Data Base (KeDB), knowledge base, or data store. The process 92 may also include performing one or more remediation actions to correct or remediate the symptoms in the network. In some embodiments, the network may be a heterogeneous enterprise network.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
a network interface configured to obtain performance data from network elements in a network;
a processing device; and
a memory device configured to store a computer program having instructions that, when executed, cause the processing device to:
derive symptoms indicative of issues in the network by utilizing the performance data obtained from the network elements in the network;
store the derived symptoms in a database;
obtain diagnostics from the network elements in the network;
utilize the database to compute distances between the derived symptoms and each of the diagnostics, wherein the computed distances correspond to dissimilarities between the derived symptoms and the diagnostics, and wherein the computed distances are computed based on machine learning models, user feedback, and analytical functions; and
analyze a root cause of the derived symptoms based on a lowest distance selected from the computed distances.

2. The system of claim 1, wherein the instructions further enable the processing device to classify the diagnostics by grouping the diagnostics into multiple groups based on a distance function related to the computed distances.

3. The system of claim 1, wherein the instructions further enable the processing device to utilize a weighting factor to determine normalized distances of the diagnostics, wherein the normalized distances are configured to account for different ranges of diagnostics from different network elements of the network.

4. The system of claim 1, wherein the instructions further enable the processing device to collect relevant information from the network elements and stream the relevant information to allow the symptoms to be derived.

5. The system of claim 4, wherein the relevant information includes one or more of Performance Monitoring (PM) data, performance metrics, errors, faults, issues, alarms, and network topology.

6. The system of claim 1, wherein the instructions further enable the processing device to conduct supervised ML to train an algorithm for recognizing the diagnostics.

7. The system of claim 1, wherein the instructions further enable the processing device to receive user feedback configured to revise one or more diagnostics stored in the database.

8. The system of claim 1, wherein the database is a Known error Data Base (KeDB).

9. The system of claim 1, wherein the instructions further enable the processing device to perform one or more remediation actions to correct or remediate the derived symptoms in the network.

10. The system of claim 1, wherein the network is a heterogeneous enterprise network.

11. A non-transitory computer-readable medium configured to store a computer program having instructions that, when executed, enable one or more processing devices to:
derive symptoms indicative of issues in a network by utilizing performance data obtained from network elements in the network;
store the derived symptoms in a database;
obtain diagnostics from the network elements in the network;
utilize the database to compute distances between the derived symptoms and each of the diagnostics, wherein the computed distances correspond to dissimilarities between the derived symptoms and the diagnostics, and wherein the computed distances are computed based on machine learning models, user feedback, and analytical functions; and
analyze a root cause of the derived symptoms based on a lowest distance selected from the computed distances.

12. The non-transitory computer-readable medium of claim 11, wherein the instructions further enable the one or more processing devices to classify the diagnostics by grouping the diagnostics based on a distance function related to the computed distances.

13. The non-transitory computer-readable medium of claim 11, wherein the instructions further enable the one or more processing devices to utilize a weighting factor to determine normalized distances of the diagnostics, and wherein the normalized distances are configured to account for different ranges of diagnostics from different network elements in the network.

14. The non-transitory computer-readable medium of claim 11, wherein the instructions further enable the one or more processing devices to:
collect relevant information from a plurality of network elements configured in the network; and
stream the relevant information to allow the symptoms to be derived;
wherein the relevant information includes one or more of Performance Monitoring (PM) data, performance metrics, errors, faults, issues, alarms, and network topology.

15. A method comprising the steps of:
deriving symptoms indicative of issues in a network by utilizing performance data obtained from network elements in the network;
storing the derived symptoms in a database;
obtaining diagnostics from the network elements in the network;
utilizing the database to compute distances between the derived symptoms and each of the diagnostics, the computed distances corresponding to dissimilarities between the derived symptoms and the diagnostics, wherein the computed distances are computed based on machine learning models, user feedback, and analytical functions; and
analyzing a root cause of the derived symptoms based on a lowest distance selected from the computed distances.

16. The method of claim 15, further comprising the steps of:
classifying the diagnostics by grouping the diagnostics based on a distance function related to the computed distances; and
utilizing a weighting factor to determine normalized distances of the diagnostics, wherein the normalized distances are configured to account for different ranges of diagnostics from different network elements in the network.

17. The method of claim 15, further comprising the steps of:
- collecting relevant information from the network elements; and
- streaming the relevant information to allow the symptoms to be derived;
- wherein the relevant information includes one or more of Performance Monitoring (PM) data, performance metrics, errors, faults, issues, alarms, and network topology.

18. The method of claim 15, further comprising the steps of:
- utilizing a Machine Learning (ML) model or analytics to compute the distances and analyze the root cause;
- conducting supervised ML to train an algorithm for recognizing the diagnostics; and
- receiving user feedback configured to revise one or more diagnostics stored in the database.

19. The method of claim 15, wherein the database is a Known error Data Base (KeDB), and wherein the network is a heterogeneous enterprise network.

20. The method of claim 15, further comprising the step of performing one or more remediation actions to correct or remediate the derived symptoms in the network.

* * * * *